United States Patent
Huang

(10) Patent No.: US 10,295,117 B2
(45) Date of Patent: May 21, 2019

(54) LABOR SAVING DEVICE

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventor: Fu-Kuo Huang, New Taipei (TW)

(73) Assignees: HONGFUJIN PRECISION INDUSTRY (WUHAN) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/694,169

(22) Filed: Sep. 1, 2017

(65) Prior Publication Data
US 2018/0363843 A1    Dec. 20, 2018

(30) Foreign Application Priority Data
Jun. 14, 2017 (CN) .......................... 2017 1 0448536

(51) Int. Cl.
*F16M 13/02* (2006.01)
*A47B 97/00* (2006.01)
*F16F 3/04* (2006.01)

(52) U.S. Cl.
CPC ......... *F16M 13/022* (2013.01); *A47B 97/001* (2013.01); *F16F 3/04* (2013.01); *F16M 2200/047* (2013.01)

(58) Field of Classification Search
CPC ... F16M 13/022; F16M 2200/047; F16F 3/04; A47B 97/001
USPC .......................... 248/560, 581, 564, 570, 584
See application file for complete search history.

(56) References Cited

U.S. PATENT DOCUMENTS

| | | | |
|---|---|---|---|
| 9,631,772 B1* | 4/2017 | Huang | F16M 13/022 |
| 2013/0194662 A1* | 8/2013 | Kepley, Jr. | G03B 21/30 |
| | | | 359/443 |
| 2014/0117197 A1* | 5/2014 | Stover | F16M 11/046 |
| | | | 248/558 |
| 2018/0363843 A1* | 12/2018 | Huang | F16M 13/022 |

* cited by examiner

*Primary Examiner* — Muhammad Ijaz
(74) *Attorney, Agent, or Firm* — ScienBiziP, P.C.

(57) ABSTRACT

A device to handle and manage a heavy screen includes a supporting module, a connecting module, two first resilient members, and two second resilient members. The connecting module includes a mounting rod provided with a pulling rod at a middle portion, and two pivot rods rotatably installed on one end far away from the mounting rod of the pulling rod. Each first resilient member is connected to an end of the top plate, and each second resilient member is connected to an end of the bottom plate and one end of a pivot rod. The two first resilient members are stretched when screen is pulled down, and each pivot rod rotates relative to the pulling rod to pull the two second resilient members when screen is lifted. The screen is effectively weightless, enabling static positioning of the screen.

19 Claims, 4 Drawing Sheets

# LABOR SAVING DEVICE

CROSS-REFERENCE TO RELATED APPLICATIONS

This application claims priority to Chinese Patent Application No. 201710448536.3 filed on Jun. 14, 2017 the contents of which are incorporated by reference herein.

FIELD

The subject matter herein generally relates to labor saving device.

BACKGROUND

An electronic whiteboard is typically fixed by the bracket for the ease of using. However, since the electronic whiteboard is heavy, it is necessary to use strength to push the electronic whiteboard when the position of the electronic whiteboard needs to be changed strength is also required to make the electronic whiteboard stop moving.

BRIEF DESCRIPTION OF THE DRAWINGS

Implementations of the present disclosure will now be described, by way of example only, with reference to the attached figures.

DETAILED DESCRIPTION

Figure 1:
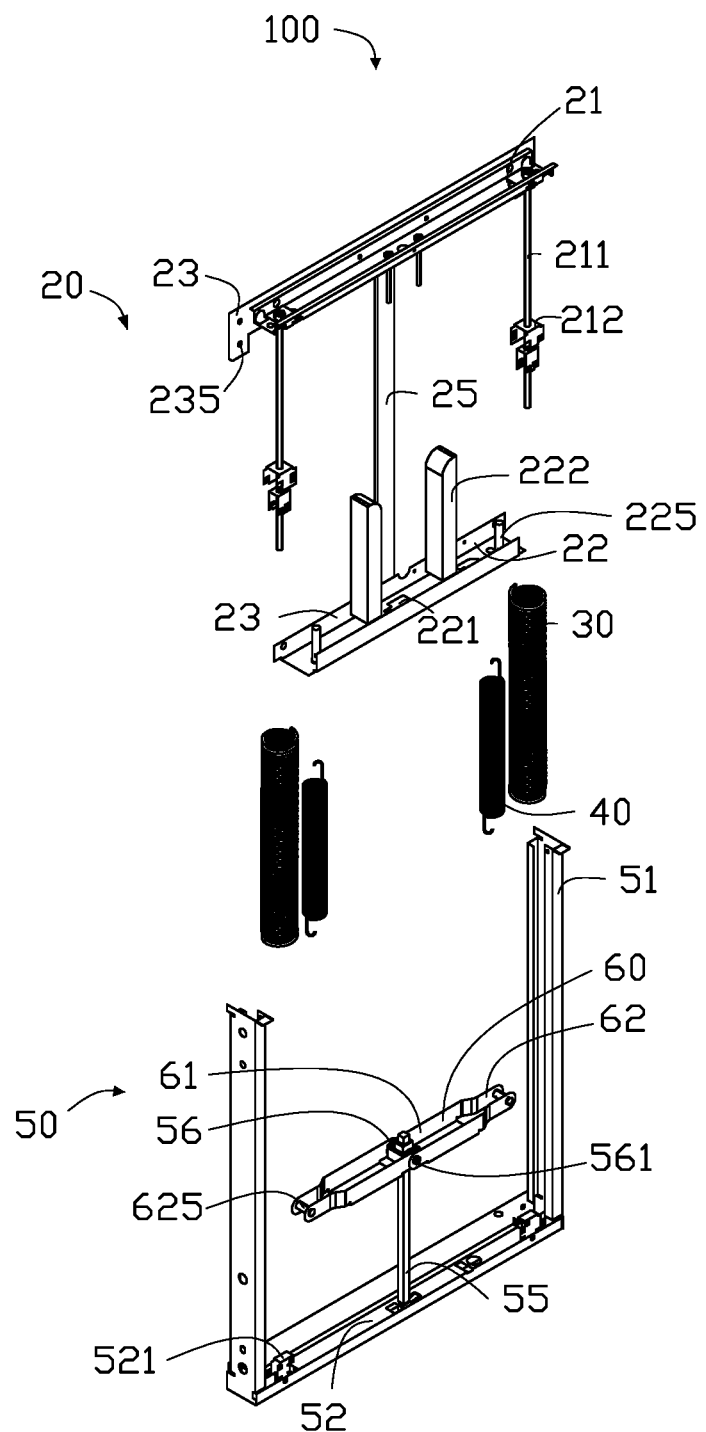
FIG. 1 is an exploded view of an exemplary embodiment of a labor saving device in relation to a movable display screen.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the exemplary embodiments described herein.

Several definitions that apply throughout this disclosure will now be presented.

The term "outside" refers to a region that is beyond the outermost confines of a physical object. The term "inside" indicates that at least a portion of an object is contained within a boundary formed by another object. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series, and the like.

FIG. 1 illustrates one exemplary embodiment of a labor saving device 100 installed onto an electronic whiteboard (not shown) to conveniently move the electronic whiteboard. The labor saving device 100 includes a supporting module 20, two first resilient members 30, two second resilient members 40 and a connecting module 50. In at least one embodiment, the first resilient members 30 and the second resilient members 40 are spring dampers.

Figure 2:
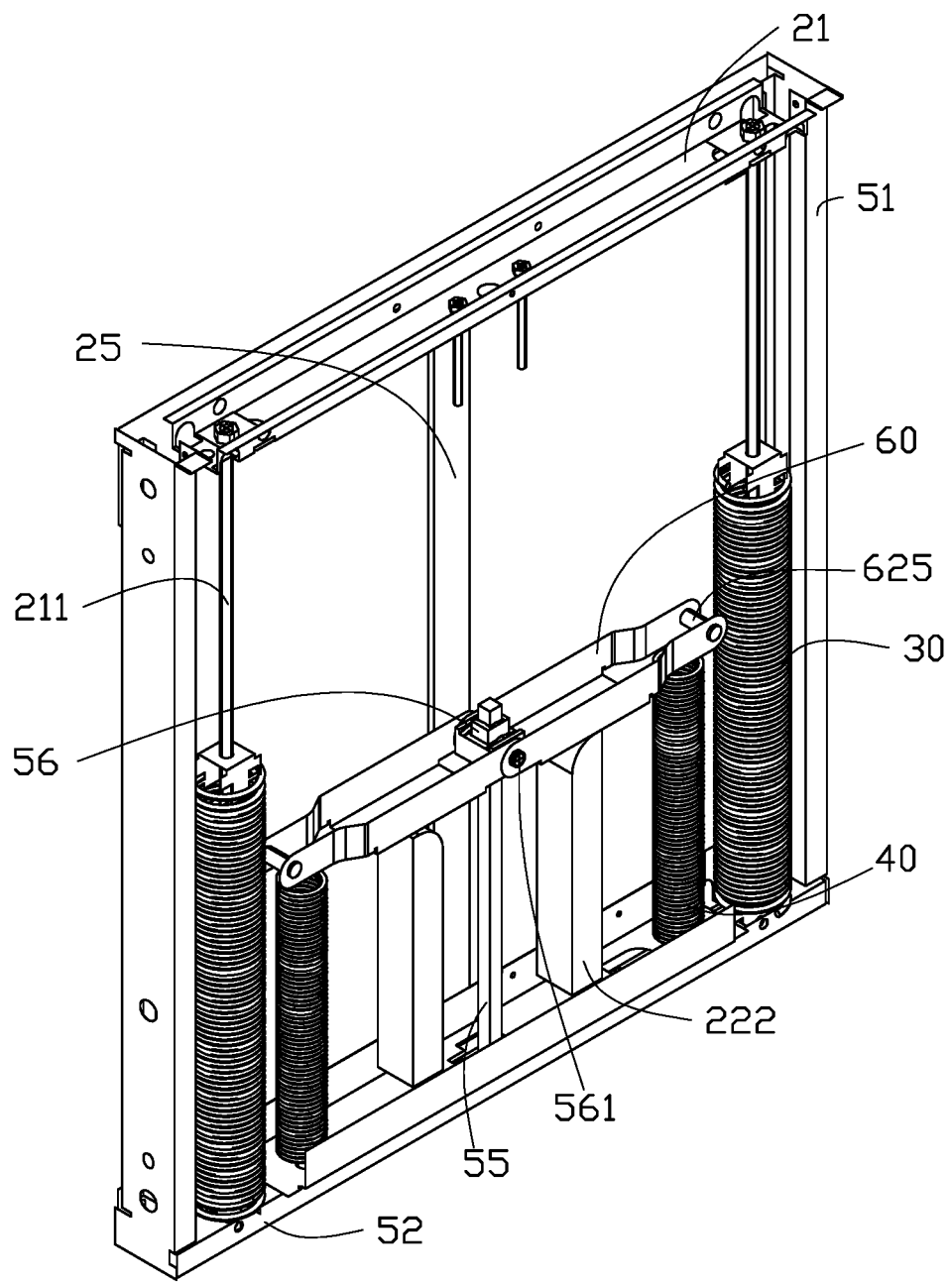
FIG. 2 is an assembled view of the labor saving device of FIG. 1.

FIG. 1 and FIG. 2 illustrate that the supporting module 20 includes a top plate 21, a bottom plate 22 parallel to the top plate 21, and a connecting plate 25 connecting the top plate 21 with the bottom plate 22. One side of the top plate 21 is provided with a side plate 23, and the same side of the bottom plate 22 is provided with a side plate 23. The side plate 23 defines a plurality of securing holes 235, a plurality of fasteners (not shown) can pass through the securing holes 235 to secure the supporting module 20. In at least one embodiment, the fasteners pass through the securing holes 235 to be inserted into a wall to secure the supporting module 20 on the wall. The ends of the connecting plate 25 are respectively connected to the side plate 23 of the top plate 21 and the side plate 23 of the bottom plate 22 to connect the top plate 21 with the bottom plate 22.

A connecting rod 211 is vertically connected to each end of the top plate 21. The far end of each rod 211 away from the top plate 21 is provided with a fixing member 212, and each fixing member 211 is configured to connect to one end of each first resilient member 30. The bottom plate 22 defines a through hole 221 in the middle portion and a stopper column 222 is located on two sides of the through hole 221. The two stopper columns 222 are parallel to each other. The lengths of two stopper columns 222 are approximately equal. Each end of the bottom plate 22 is provided with a securing column 225. Each securing column 225 is connected with one end of each second resilient member 40.

The connecting module 50 includes two side rods 51 parallel to each other, and a mounting rod 52 connected between the two side rods 51. Each end of the mounting rod 52 is provided with a securing member 521 to connect to the other end of each first resilient member 30. A middle portion of the mounting rod 52 is provided with a pulling rod 55, and the pulling rod 55 can pass through the through hole 221 of the bottom plate 22. One end away from the mounting rod 52 of the pulling rod 55 is provided with a pivot member 56. Each side of the pivot member 56 is provided with two pivot shafts 561. Two pivot rods 60 are rotatably installed on the pivot member 56.

Each pivot rod 60 includes a first end 61 and a second end 62. The first ends 61 of two pivot rods 60 are close to each other, and the second ends 62 of two pivot rods 60 are far away from each other. The first end 61 of each pivot rod 60 is rotatably installed on the pivot shaft 561. The second end 62 of each pivot rod 60 includes a securing shaft 625, and each securing shaft 625 is configured to connect to the other end of each second resilient member 40.

Figure 3:
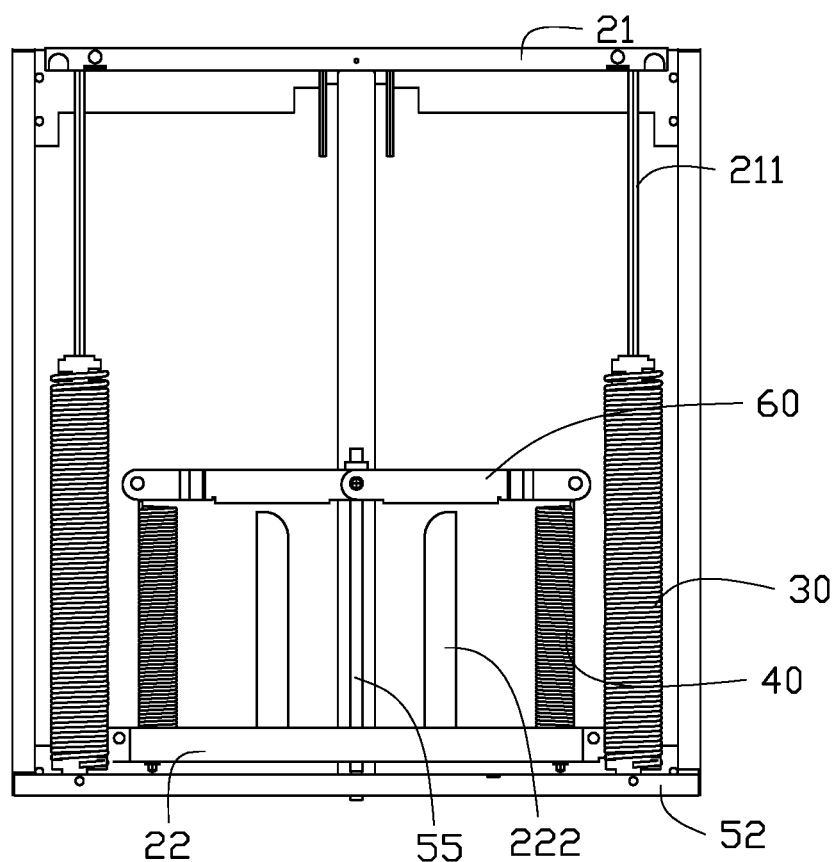
FIG. 3 is a front view of the labor saving device of FIG. 1.

FIGS. 1 to 3 illustrate assembly of the labor saving device 100. The fasteners pass through the securing holes 235 of the side plate 23 to secure the supporting module 20. The connecting module 50 is placed on the supporting module 20. One end of each first resilient member 30 is connected to the fixing member 212 of the connecting rod 211, the other end of each first resilient member 30 is connected to the securing member 532 of the mounting rod 52. Thus, the connecting module 50 is connected with the supporting module 20 by the two resilient members 30.

The pulling rod 55 passes through the through hole 221 of the bottom plate 22, the first end 61 of each pivot rod 60 is rotatably installed on the pivot shaft 561. One end of each second resilient member 40 is secured on the securing shaft 625 of each pivot rod 60 (shown in FIG. 2), and the other end of second resilient member 40 is secured on the securing column 225 of the bottom plate 22. Thereby, the labor saving device 100 is assembled.

When the electronic whiteboard is mounted on the labor saving device 100, the two first resilient member 30 are elastically stretched to overcome the weight of the electronic whiteboard, and the two pivot rods 60 are parallel to each other and are in the same horizontal line. In at least one embodiment, the connection between the electronic whiteboard and the labor saving device 100 is a conventional technical means, and the present invention is not repeated here.

Figure 4:
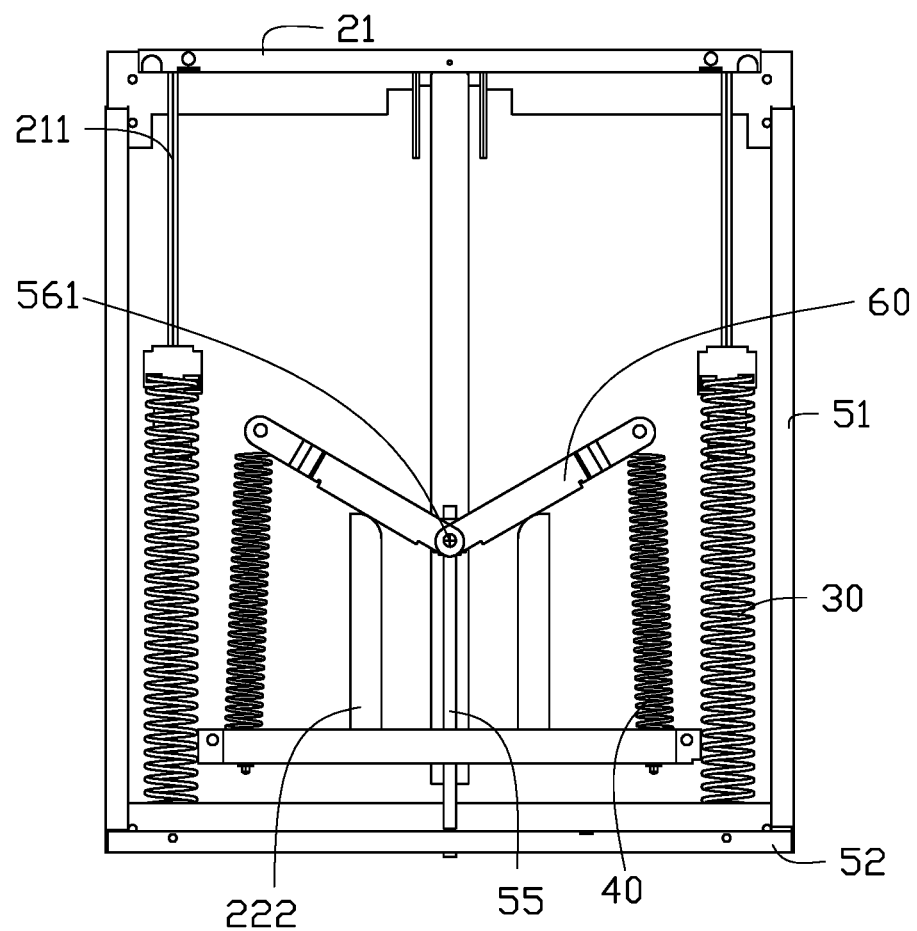
FIG. 4 is similar to FIG. 3, but a connecting module is in another position.

As FIGS. 3 and 4 illustrate, when the electronic whiteboard is to be moved vertically downward, the electronic whiteboard is pulled down vertically and the connecting module 50 is driven downwardly. The mounting rod 52 drives the first resilient member 30 to continue stretching. Due to the weight of the electronic whiteboard, it is not requiring too much force to pull the electronic whiteboard. The electronic whiteboard is continuously pulled down and the two pivot rods 60 abut against the two stopper columns 222.

The pulling rod 55 continues to drive the pivot rods 60 downwardly. The first end 61 of each pivot rod 60 is rotated relative to the pivot shaft 561, and the second end 62 of each pivot rod 60 is moved upwardly to stretch the two second resilient members 40. The two second resilient members 40 are elastically stretched so that the electronic whiteboard can be easily stopped. At this time, the electronic whiteboard maintains its current position due to the damping effect of the two first resilient members 30 and the two second resilient members 40.

The exemplary embodiments shown and described above are only examples. Many details are often found in the art such as the other features of labor saving device. Therefore, many such details are neither shown nor described. Even though numerous characteristics and advantages of the present disclosure have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A labor saving device, comprising:
    a supporting module, comprising:
        a top plate; and
        a bottom plate parallel to the top plate, the bottom plate having two stopper columns;
    a connecting module, comprising:
        a mounting rod provided with a pulling rod at a middle portion; and
        two pivot rods rotatably installed on one end away from the mounting rod of the pulling rod;
    two first resilient members; and
    two second resilient members;
    wherein two ends of each first resilient member are respectively connected to the top plate and the mounting rod to connect the supporting module with the connecting module, two ends of each second resilient member are connected to the bottom plate and the pivot rod; the connecting module is pulled vertically downwardly to pull the two first resilient members, the pulling rod pulls the two pivot rods downwardly, the two stopper columns abut against the two pivot rods, and each pivot rod rotates relative to the pulling rod to pull the end of each second resilient member connected to the corresponding pivot rod of the said pair of pivot rods away from the bottom plate, the two first resilient members and the two second resilient members being elastically stretched to stop the connecting module.

2. The labor saving device of claim 1, wherein each end of the top plate is provided with a connecting rod, and one end of each first resilient member is connected to the connecting rod.

3. The labor saving device of claim 2, wherein one end far away from the top plate of each connecting rod is provided with a fixing member, and one end of each first resilient member is connected to the fixing member.

4. The labor saving device of claim 1, wherein each end of the mounting rod is provided with a securing member, and the other end of each first resilient member is connected to the securing member.

5. The labor saving device of claim 1, wherein the bottom plate defines a through hole, the pulling rod is configured to be inserted into the through hole and slid relative to the through hole.

6. The labor saving device of claim 1, wherein one end far away from the mounting rod of the pulling rod is provided with a pivot member, both sides of the pivot member are respectively provided with two pivot shafts, and the two pivot rods are rotatably installed on the pivot shaft.

7. The labor saving device of claim 6, wherein each pivot rod comprises a first end and a second end opposite to the first end, the first end is rotatably installed on the pivot shaft, and each second resilient member is connected to the second end.

8. The labor saving device of claim 7, wherein the second end of each pivot rod is provided with a securing shaft, and each second resilient member is connected to the securing shaft.

9. The labor saving device of claim 1, wherein the top plate and the bottom plate define a plurality of securing hole, a plurality of fasteners passes through the securing holes to secure the supporting module.

10. The labor saving device of claim 9, wherein two side plates are protruding from one side of the top plate and one side of the bottom plate, the securing holes are respectively located on the side plates.

11. A labor saving device, comprising:
    a supporting module, comprising:
        a top plate, each end of the top plate comprising a connecting rod; and
        a bottom plate parallel to the top plate, the bottom plate having two stopper columns;
    a connecting module, comprising:
        a mounting rod provided with a pulling rod at a middle portion; and
        two pivot rods rotatably installed on one end away from the mounting rod of the pulling rod;
    two first resilient members; and
    two second resilient members;
    wherein two ends of each first resilient member are respectively connected to the connecting rods and the mounting rod to connect the supporting module with the connecting module, two ends of each second resilient member are connected to the bottom plate and the pivot rod; the connecting module is pulled vertically downwardly to pull the two first resilient members, the pulling rod pulls the two pivot rods downwardly, the two stopper columns abut against the two pivot rods, and each pivot rod rotates relative to the pulling rod to pull the end of each second resilient member connected to the corresponding pivot rod of the said pair of pivot rods away from the bottom plate, the two first resilient members and the two second resilient members are elastically stretched to stop the connecting module.

12. The labor saving device of claim 11, wherein one end far away from the top plate of each connecting rod is provided with a fixing member, and one end of each first resilient member is connected to the fixing member.

13. The labor saving device of claim 11, wherein each end of the mounting rod is provided with a securing member, and the other end of each first resilient member is connected to the securing member.

14. The labor saving device of claim 11, wherein the bottom plate defines a through hole, the pulling rod is configured to be inserted into the through hole and slid relative to the through hole.

15. The labor saving device of claim 11, wherein one end far away from the mounting rod of the pulling rod is provided with a pivot member, both sides of the pivot member are respectively provided with two pivot shafts, and the two pivot rods are rotatably installed on the pivot shaft.

16. The labor saving device of claim 15, wherein each pivot rod comprises a first end and a second end opposite to the first end, the first end is rotatably installed on the pivot shaft, and each second resilient member is connected to the second end.

17. The labor saving device of claim 16, wherein the second end of each pivot rod is provided with a securing shaft, and each second resilient member is connected to the securing shaft.

18. The labor saving device of claim 11, wherein the top plate and the bottom plate define a plurality of securing hole, a plurality of fasteners passes through the securing holes to secure the supporting module.

19. The labor saving device of claim 18, wherein two side plates are protruding from one side of the top plate and one side of the bottom plate, the securing holes are respectively located on the side plates.

\* \* \* \* \*